United States Patent
Ali Khan et al.

(10) Patent No.: US 10,072,565 B2
(45) Date of Patent: Sep. 11, 2018

(54) WASTEGATE CLOSED POSITION DETENT FEATURE

(71) Applicant: GM Global Technology Operations LLC, Detroit, MI (US)

(72) Inventors: Maqsood Rizwan Ali Khan, Rochester Hills, MI (US); Pulasti Bandara, Clinton Township, MI (US); Mark R. Claywell, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 15/183,111

(22) Filed: Jun. 15, 2016

(65) Prior Publication Data

US 2017/0362996 A1    Dec. 21, 2017

(51) Int. Cl.
*F02B 37/18*    (2006.01)

(52) U.S. Cl.
CPC ........... *F02B 37/186* (2013.01); *Y02T 10/144* (2013.01)

(58) Field of Classification Search
CPC ..................................................... F02B 37/186
See application file for complete search history.

(56) References Cited

U.S. PATENT DOCUMENTS

| | | | |
|---|---|---|---|
| 6,672,565 B2 * | 1/2004 | Russell ................ | E21B 21/106 251/297 |
| 8,499,557 B2 | 8/2013 | Grabowska | |
| 2011/0120431 A1 * | 5/2011 | Lilly .................... | F02B 37/186 123/568.12 |

* cited by examiner

*Primary Examiner* — Mary A Davis
(74) *Attorney, Agent, or Firm* — Harness, Dickey & Pierce, P.L.C.

(57) ABSTRACT

A vehicle powertrain includes an engine having an air intake system and an exhaust system. A turbocharger includes a turbine section connected to the exhaust system and a compressor section connected to the air intake system. A wastegate is disposed in the exhaust system and movable between an open and a closed position by an actuator system. The actuator system includes an engagement device and detent mechanism for assisting with holding the wastegate in the closed position.

16 Claims, 6 Drawing Sheets

WASTEGATE CLOSED POSITION DETENT FEATURE

FIELD

The present disclosure relates to turbocharged engines and more particularly to a turbocharged engine provided with a turbocharger having a wastegate with a detent feature that assists in holding the wastegate in a closed position.

BACKGROUND

This section provides background information related to the present disclosure which is not necessarily prior art.

Engine assemblies may incorporate the use of turbochargers to compress the air flowing into the engine to provide a greater amount of air to each cylinder. In order to compress the air flow into the engine, the turbocharger uses exhaust flow from the engine to spin a turbine, which in turn spins an air pump (or compressor). Many turbochargers are provided with a wastegate which acts as a valve to divert exhaust gases away from the turbine wheel in a turbocharged engine system in order to regulate the turbine speed. A wastegate is usually controlled by an actuator. A wastegate is normally closed and is held shut by the actuator. When a preset pressure limit is exceeded, the actuator progressively opens the wastegate allowing exhaust flow to bypass the turbine, thus regulating manifold boost pressure. A turbocharger wastegate actuator is selected or engineered for specified boost level and turbine inlet pressure.

SUMMARY

This section provides a general summary of the disclosure, and is not a comprehensive disclosure of its full scope or all of its features.

A vehicle powertrain includes an engine having an air intake system and an exhaust system. A turbocharger includes a turbine section connected to the exhaust system and a compressor section connected to the air intake system. A wastegate is disposed in the exhaust system and is movable between an open and a closed position by an actuator system. The actuator system includes an engagement device and a detent mechanism for assisting with holding the wastegate in the closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
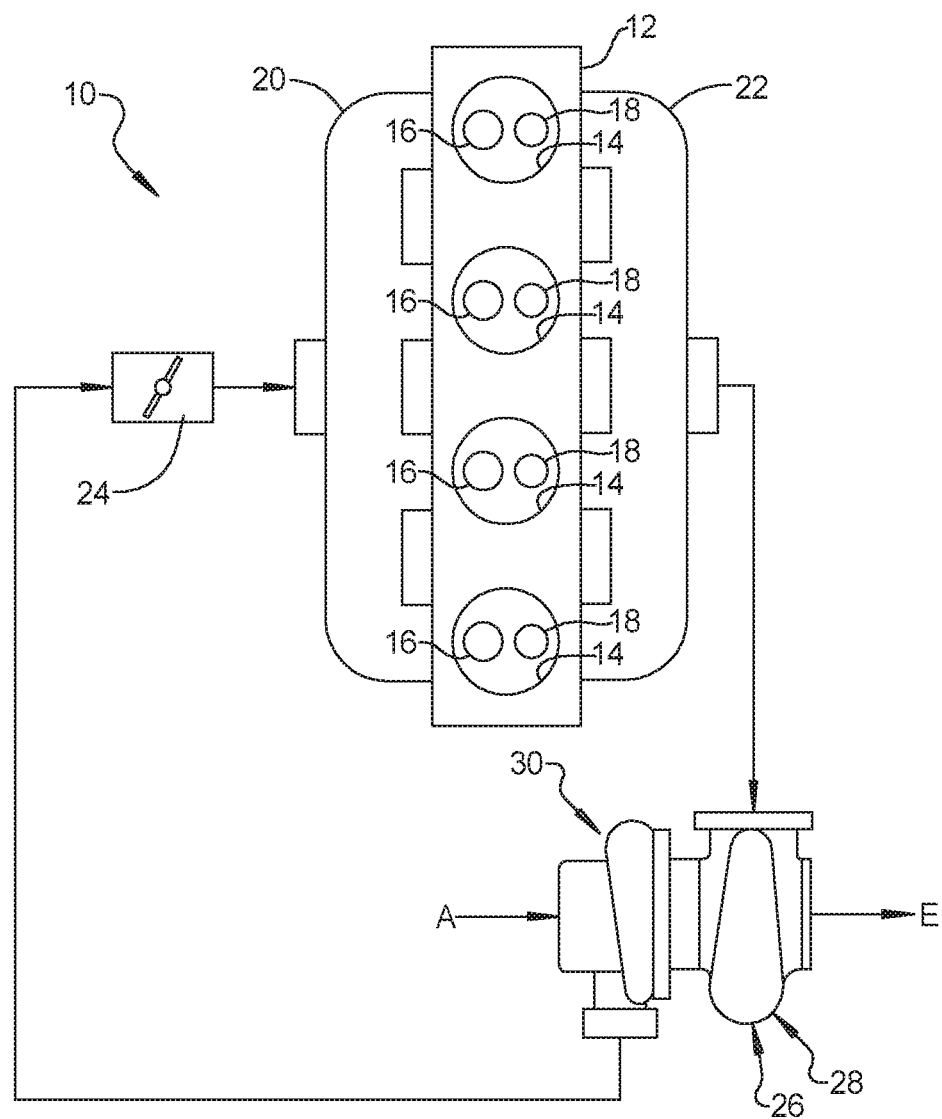
FIG. 1 is a schematic illustration of an engine assembly according to the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An engine assembly 10 is illustrated in FIG. 1 and may include an engine structure 12 defining cylinders 14 and intake and exhaust ports 16, 18 in communication with the cylinders 14, an intake manifold 20, exhaust manifold 22, a throttle valve 24 and a turbocharger 26. The engine assembly 10 is illustrated as an inline four cylinder arrangement for simplicity. However, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

Figure 2:
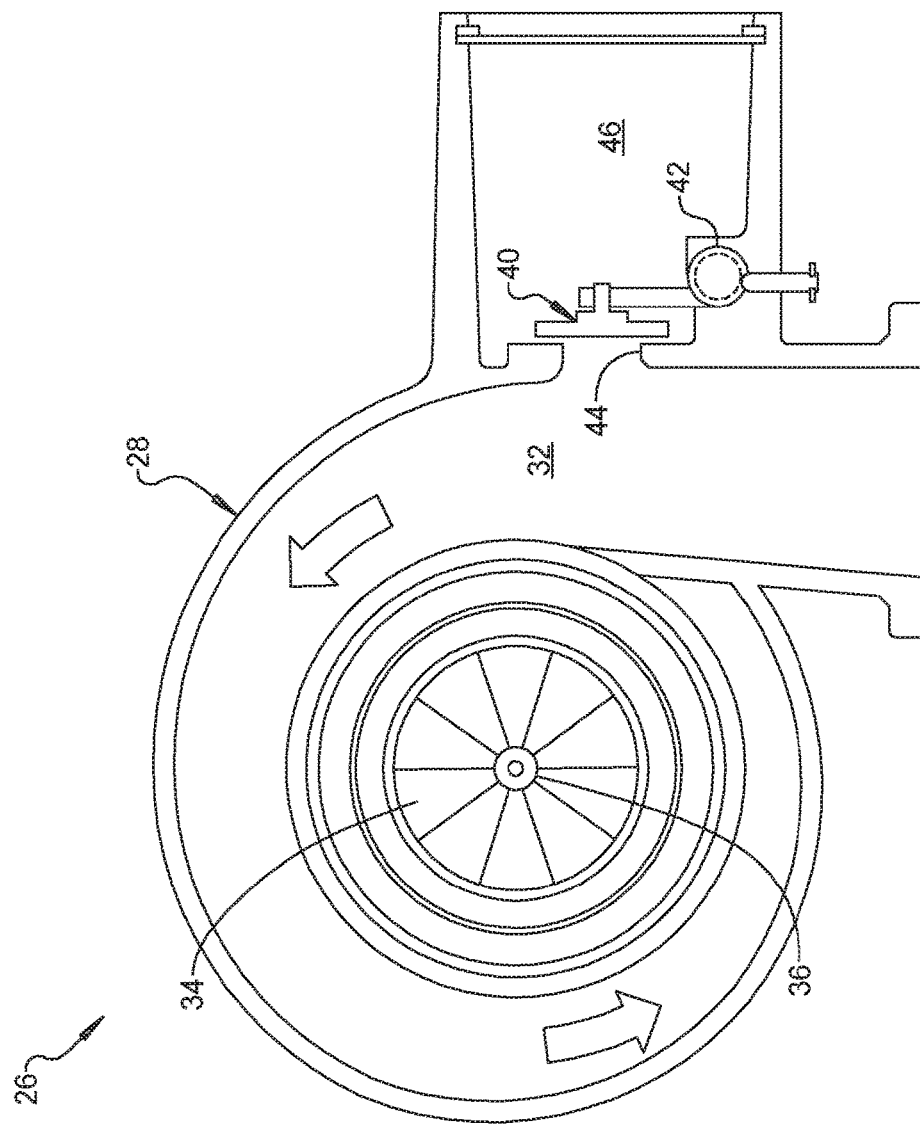
FIG. 2 is a schematic section illustration of a turbocharger having a wastegate held in a closed position by an engagement device and detent mechanism according to the principles of the present disclosure.
Figure 3:
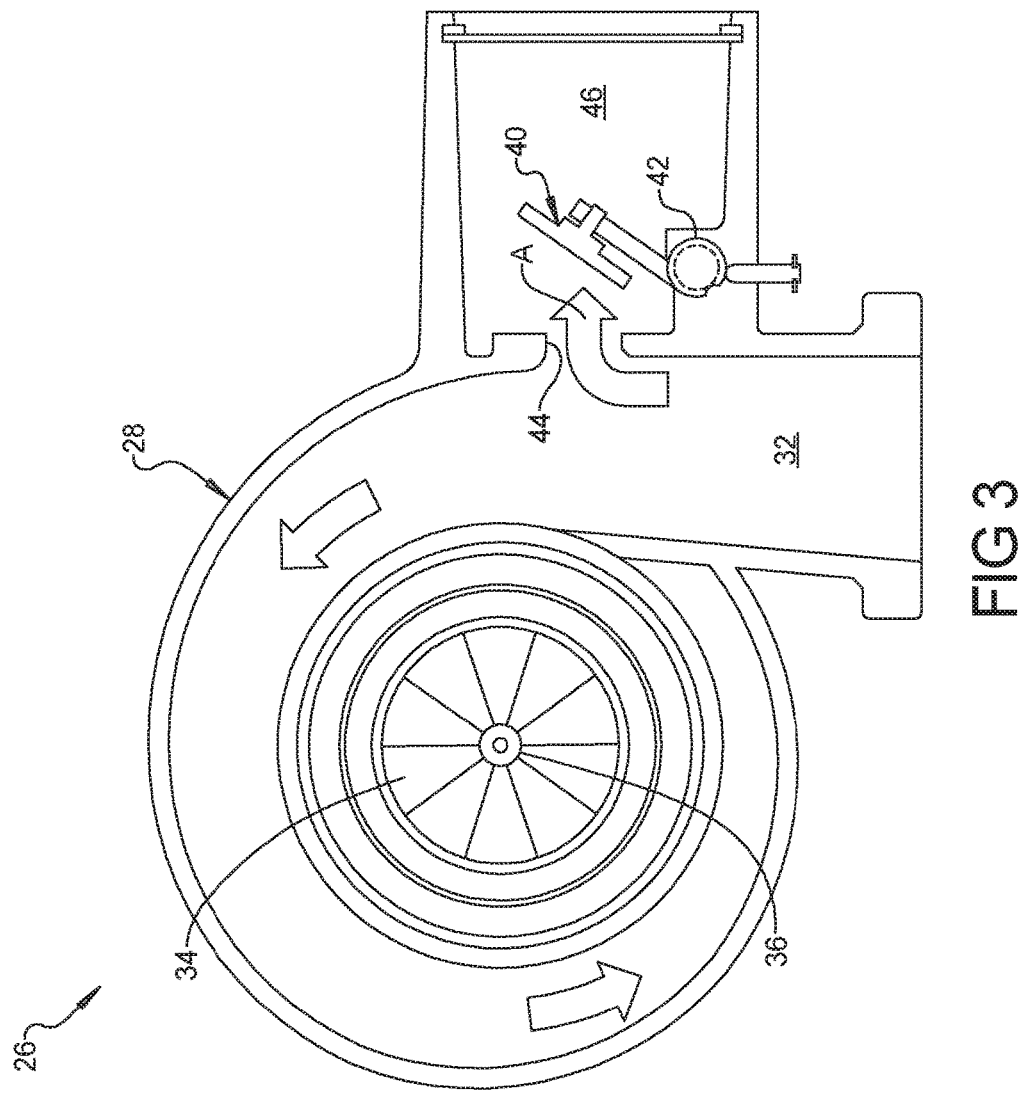
FIG. 3 is a schematic section illustration of the turbocharger of FIG. 2 having the wastegate shown in an open position according to the principles of the present disclosure.

The turbocharger 26 includes a turbine section 28 in communication with the exhaust manifold 22 and a compressor section 30 in communication with the intake manifold 20. With reference to FIG. 2, a cross-sectional view of the turbine section 28 includes a turbine passage 32 that communicates with a turbine wheel 34. As is known in the art, the turbine wheel 34 is connected to a shaft 36 that drives a compressor wheel within the compressor section 30. A wastegate 40 is pivotally mounted to the turbine section 28 by a pivot shaft 42. The wastegate 40 closes an orifice 44 in communication with an exhaust bypass passage 46. As shown in FIG. 3, the wastegate 40 is movable to an open position so that exhaust gasses can bypass the turbine wheel 34 in the direction of arrow A.

Figure 4:
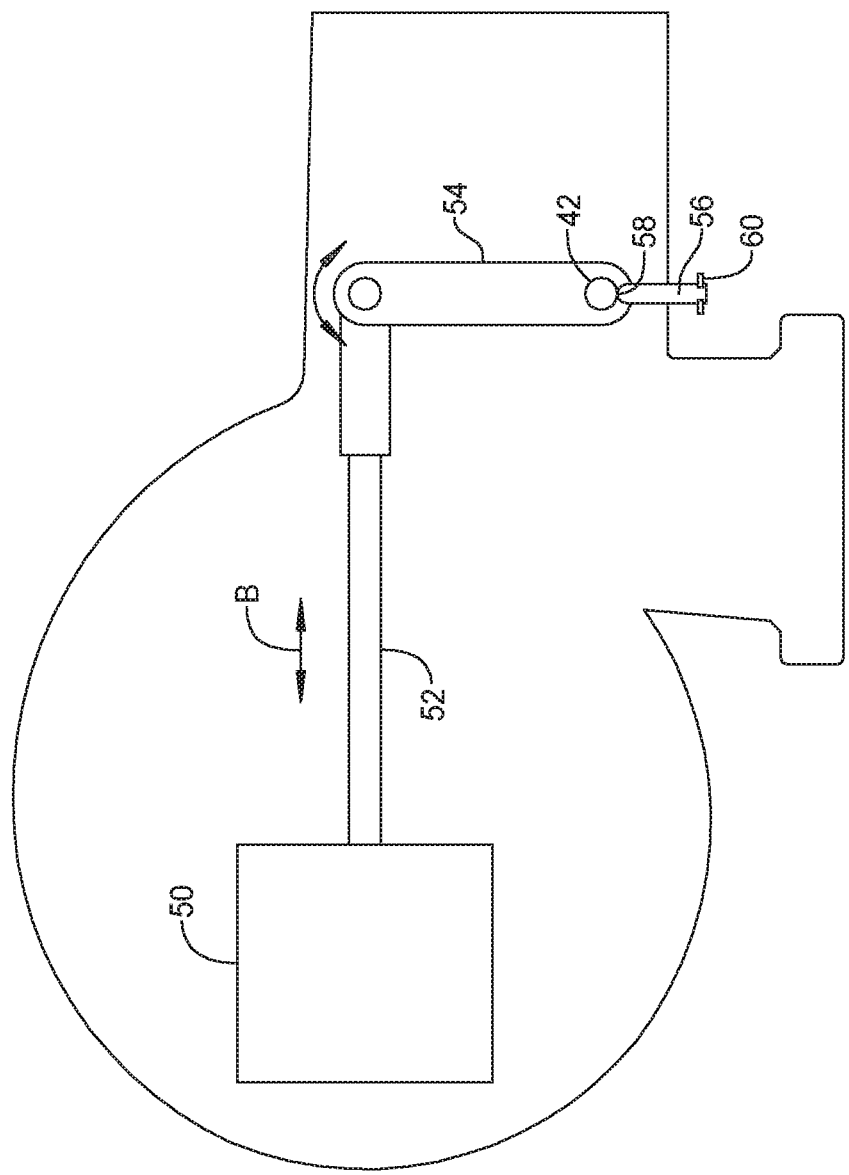
FIG. 4 is a schematic side view of a turbocharger having a wastegate actuator according to the principles of the present disclosure.
Figure 6:
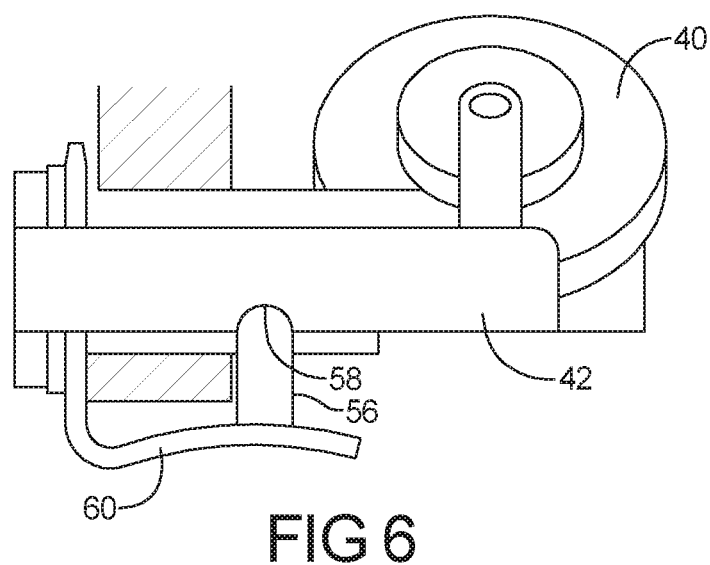
FIG. 6 is a schematic illustration of a spring biased engagement device and detent according to the present disclosure.
Figure 7:
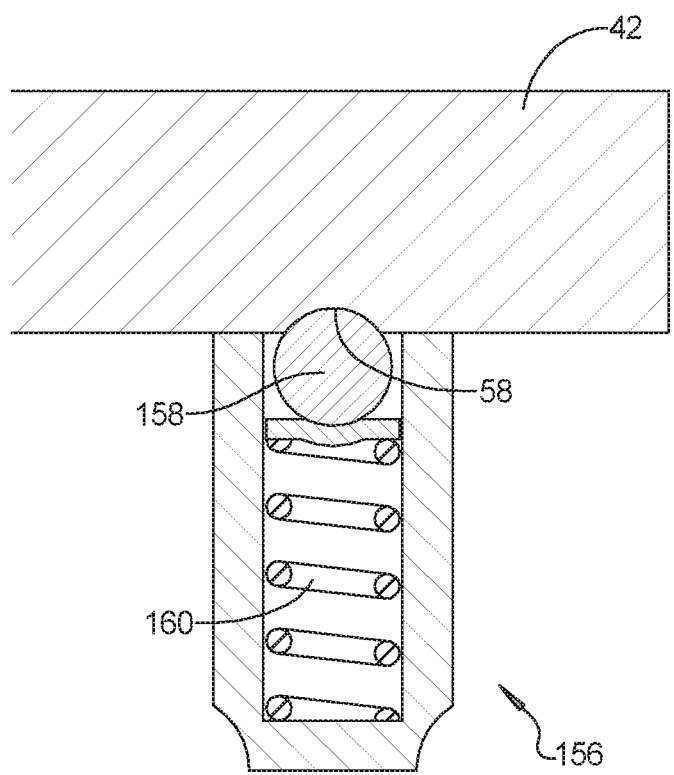
FIG. 7 is a schematic illustration of an alternative spring biased engagement device and detent according to the principles of the present disclosure.

With reference to FIG. 4, an actuator 50 is shown including an arm 52 which engages a lever 54 that is fixedly attached to the pivot shaft 42. The actuator 50 can be a solenoid, pneumatic, electro-mechanical or hydraulic or other actuator that provides longitudinal movement in a linear direction as indicated by arrow B, and that can therefore cause pivotal motion of the lever 54 to cause corresponding pivoting motion of the pivot shaft 42. It should be understood that other actuators can also be used including non-linear and rotary actuators. A spring biased engagement device 56 is provided in engagement with a detent 58 provided in the surface of the pivot shaft 42. The engagement device 56 is biased by a spring member 60, such as shown in FIG. 6. It should be understood that the engagement device 56 and spring member 60 can take on many forms such as the leaf spring arrangement as shown in FIG. 6. In addition, as shown in FIG. 7, an alternative ball detent device 156 can be utilized for engagement with the pivot shaft 42, wherein the ball detent device 156 can include a ball 158 and spring 160 devices of the ball 150 into the detent 58 in the pivot shaft 42. As shown in FIG. 3, the detent 58 can include a ramp for allowing smooth transition of the engagement device 56 into and out of the detent 58.

Figure 5:
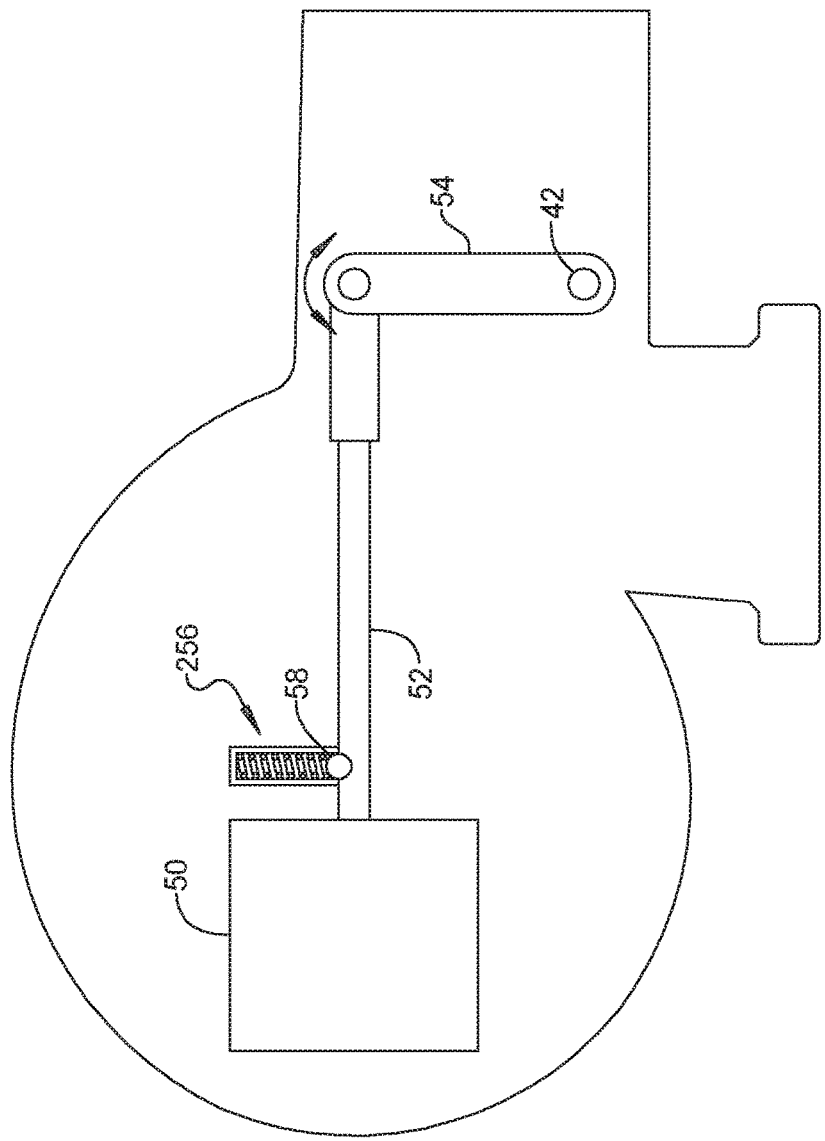
FIG. 5 is a schematic side view of a turbocharger having an alternative wastegate actuator according to the principles of the present disclosure.

According to an alternative embodiment, the engagement device and detent mechanism can be utilized at other locations within the drive system of the pivot shaft 42. In particular, as shown in FIG. 5, a ball detent mechanism 256 is shown in engagement with a detent 58 provided in the arm 52.

According to the various embodiments, the spring biased engagement device and detent mechanism 56/58 provides added force to hold the wastegate 40 in a closed position therefore reducing the stalled torque required by the actuator 50 for holding the wastegate 40 closed. Accordingly, the engagement device 56 and detent 58 allow for a smaller actuator 50 to be used. The engagement device and detent mechanism 56/58, in the various forms shown, only engages when the wastegate 40 is held in the closed position. The geometry of the detent 58 can be designed with a ramp that allows smooth transition of the engagement device 56 into and out of the detent feature 58. The design greatly reduces the required wastegate closing force while requiring a slightly increased opening force at initial wastegate opening.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle powertrain, comprising:
   an engine having an air intake system and an exhaust system;
   a turbocharger including a turbine section connected to the exhaust system and a compressor section connected to the air intake system; and
   a wastegate disposed in the exhaust system and movable between an open and a closed position by an actuator, the actuator being drivingly connected to the wastegate for moving the waste gate from a closed to an open position and means for assisting with holding the wastegate in the closed position.

2. The vehicle powertrain according to claim 1, wherein the means for assisting includes an engagement device and a detent.

3. The vehicle powertrain according to claim 2, wherein the wastegate is supported on a pivot shaft having the detent formed therein.

4. The vehicle powertrain according to claim 2, wherein the actuator is drivingly connected to the waste gate by an arm having the detent formed therein.

5. The vehicle powertrain according to claim 2, wherein the actuator includes a solenoid actuator.

6. The vehicle powertrain according to claim 2, wherein the engagement device is spring biased.

7. The vehicle powertrain according to claim 2, wherein the engagement device includes a spring biased ball.

8. The vehicle powertrain according to claim 2, wherein the detent includes a ramp for allowing smooth transition of the engagement device into and out of the detent.

9. A turbocharger, comprising:
   a turbine section and a compressor section;
   a wastegate disposed in the turbine section and movable between an open and a closed position by an actuator, the actuator being drivingly connected to the wastegate for moving the wastegate from a closed to an open position; and
   means for assisting with holding the wastegate in the closed position.

10. The turbocharger according to claim 9, wherein the means for assisting includes an engagement device and a detent.

11. The turbocharger according to claim 10, wherein the wastegate is supported on a pivot shaft having the detent formed therein.

12. The turbocharger according to claim 10, wherein the actuator is drivingly connected to the wastegate by an arm having the detent formed therein.

13. The turbocharger according to claim 10, wherein the actuator includes a solenoid actuator.

14. The turbocharger according to claim 10, wherein the engagement device is spring biased.

15. The turbocharger according to claim 10, wherein the engagement device includes a spring biased ball.

16. The turbocharger according to claim 10, wherein the detent includes a ramp for allowing smooth transition of the engagement device into and out of the detent.

* * * * *